United States Patent [19]

Hakoun et al.

[11] Patent Number: 5,253,034
[45] Date of Patent: Oct. 12, 1993

[54] DEVICE FOR DISPLAYING THE CORE OF AN OPTICAL FIBER

[75] Inventors: Roland Hakoun, Domont; Philippe Robert, Herblay; Michel Reslinger, Bondoufle; Joan Galopin, Saint Leger En Yvelines, all of France

[73] Assignee: Alcatel Fibres Optiques, Bezons Cedex, France

[21] Appl. No.: 849,185

[22] Filed: Mar. 11, 1992

[30] Foreign Application Priority Data

Mar. 12, 1991 [FR] France .............................. 91 02956

[51] Int. Cl.$^5$ ...................... G01N 21/84; G01B 11/12
[52] U.S. Cl. ................................. 356/73.1; 356/390
[58] Field of Search ........................... 356/73.1, 390

[56] References Cited

U.S. PATENT DOCUMENTS 4,362,943 12/1982 Presby .............................. 356/73.1

FOREIGN PATENT DOCUMENTS 0237426 9/1987 European Pat. Off. .
0321947 6/1989 European Pat. Off. .
3335579 4/1985 Fed. Rep. of Germany .

OTHER PUBLICATIONS

Journal of Lightwave Technology, vol. LT-2, No. 2, Apr. 1984, pp. 185–191, New York, US; O. Kawata et al.: "A splicing and inspection technique for single-mode fibers using direct core monitoring".
Patent Abstracts of Japan, Database JAPS/JPO, vol. 9, No. 210 (P383), Aug. 28, 1985; & JP-A-60070407 (Sumitomo) Apr. 22, 1985.
Patent Abstracts of Japan, Database JAPS/JPO, vol. 9, No. 174 (P374), Jul. 19, 1985; & JP-A-60049307 (Nippon Denshin) Mar. 18, 1985.

Primary Examiner—Vincent P. McGraw
Attorney, Agent, or Firm—Sughrue, Mion, Zinn, Macpeak & Seas

[57] ABSTRACT

A device for displaying the core (C) of an optical fiber (F) in two directions that are transverse to the fiber (F) includes two light sources illuminating the fiber. Each source emits a beam of light. The beams have different directions $D_1$ and $D_2$. The directions lie in a plane that is orthogonal to the longitudinal axis (X) of the fiber (F). An objective lens ($L_3$, $L_4$), reception and display components (2, 3) are employed and receive and display images of the fiber (F) produced by the beams. The objective lens is focused in a plane (P) that intercepts the beams from the fiber (F) inside the fiber (F). The angle ($\alpha_1$, $\alpha_2$) between either of the directions ($D_1$, $D_2$) and the focal axis (Y) of the objective lens ($L_3$, $L_4$) is such that the objective lens ($L_3$, $L_4$) directly receives the two beams from the fiber (F) with sufficient light intensity to enable the display component to operate.

7 Claims, 3 Drawing Sheets

DEVICE FOR DISPLAYING THE CORE OF AN OPTICAL FIBER

The present invention relates to a device for displaying the core of an optical fiber, intended in particular for quantifying attenuation losses at welds between two optical fibers or for aligning two optical fibers prior to welding.

For example, in order to align two optical fibers, it is not sufficient merely to verify that their outlines are in alignment. It is also necessary to ensure that their cores are in alignment, in particular when the fibers are monomode fibers such that small amounts of core misalignment gives rise to large amounts of attenuation at the weld. To improve core alignment accuracy, conventionally used devices such as that described in U.S. Pat. No. 4,660,972 enable the core of an optical fiber to be observed in two orthogonal directions. Such devices can also be used to observe welding defects and to calculate accurately the attenuation due to a weld.

Such devices enable an optical fiber to be illuminated transversely along two mutually orthogonal directions by means of two sources placed upstream from the fiber and emitting light in two orthogonal directions. Each beam from a source is then collimated before it intercepts the fiber. Downstream from the observed fiber, and on the paths of each of the beams coming from the fiber, there is placed a lens and then a prism or a mirror for the purpose of directing the beams so that they have the same optical paths and so that both of them arrive on a common optical display system, such as a camera. Two separate images of the fiber and its core are thus obtained, with the two images showing that which is observed in the two orthogonal lighting directions.

To be able to distinguish the core in the image of the fiber, it is necessary for there to be an index step between the core and the cladding of the observed fiber. The index step gives rise to contrast between the image of the core and the image of the cladding (the core region is darker than the cladding region), thereby enabling the image to be processed: the transition on passing from the core is detected and it is then possible to situate the edges of the core by analyzing the image.

Such devices are complex to implement because it is necessary to select the mirrors or prisms to be placed downstream in such a manner as to avoid introducing a path difference between the two beams. In addition, they require expensive precision equipment (downstream lenses, prisms or mirrors).

Other devices make it possible to do without such expensive equipment, but it is then necessary to use two separate cameras and to treat the images from the two cameras separately or else to use a moving camera which is displaced from one image to the other.

In all cases, it is therefore necessary to acquire two separate images which is lengthly and requires sophisticated equipment.

An object of the present invention is thus to provide a device that is cheaper and less complex than prior art devices for the purpose of observing the core of an optical fiber along two orthogonal directions.

To this end, the present invention provides a device for displaying the core of an optical fiber in two directions that are transverse to said fiber, the device comprising:

two light sources illuminating said fiber, each emitting a beam of light, said beams having different directions $D_1$ and $D_2$, said directions lying in a plane that is orthogonal to the longitudinal axis of said fiber;

an objective lens; and reception and display means for receiving and displaying images of said fiber produced by said beams;

the device being characterized in that said objective lens is focused in a plane that intercepts the beams from said fiber inside said fiber, and in that the angle between either of said directions and the focal axis of said objective lens is such that said objective lens directly receives the two beams from said fiber with sufficient light intensity to enable said reception means to operate.

Advantageously, the angle between each of said directions $D_1$ and $D_2$ and said focal axis lies in the range 112.5° to 157.5°.

Said directions $D_1$ and $D_2$ may be mutually orthogonal. It is then possible for the angle between $D_1$ or $D_2$ and the focal axis to be equal for both directions $D_1$ and $D_2$ to 135°.

In addition, the beams may be collimated prior to intercepting the fiber by means of two lenses respectively located on each of the beam paths, between each of the sources and the fiber.

Finally, the reception means comprise a CCD camera connected to an image processing system enabling the resulting image to be observed on a screen.

Other characteristics and advantages of the invention appear from the following description of a device of the invention given by way of non-limiting illustration.

In all of these figures, the term "upstream" is used to designate the space between the light sources and the fiber to be observed, and the term "downstream" to designate the space situated between the fiber to be observed and the camera.

Figure 1:
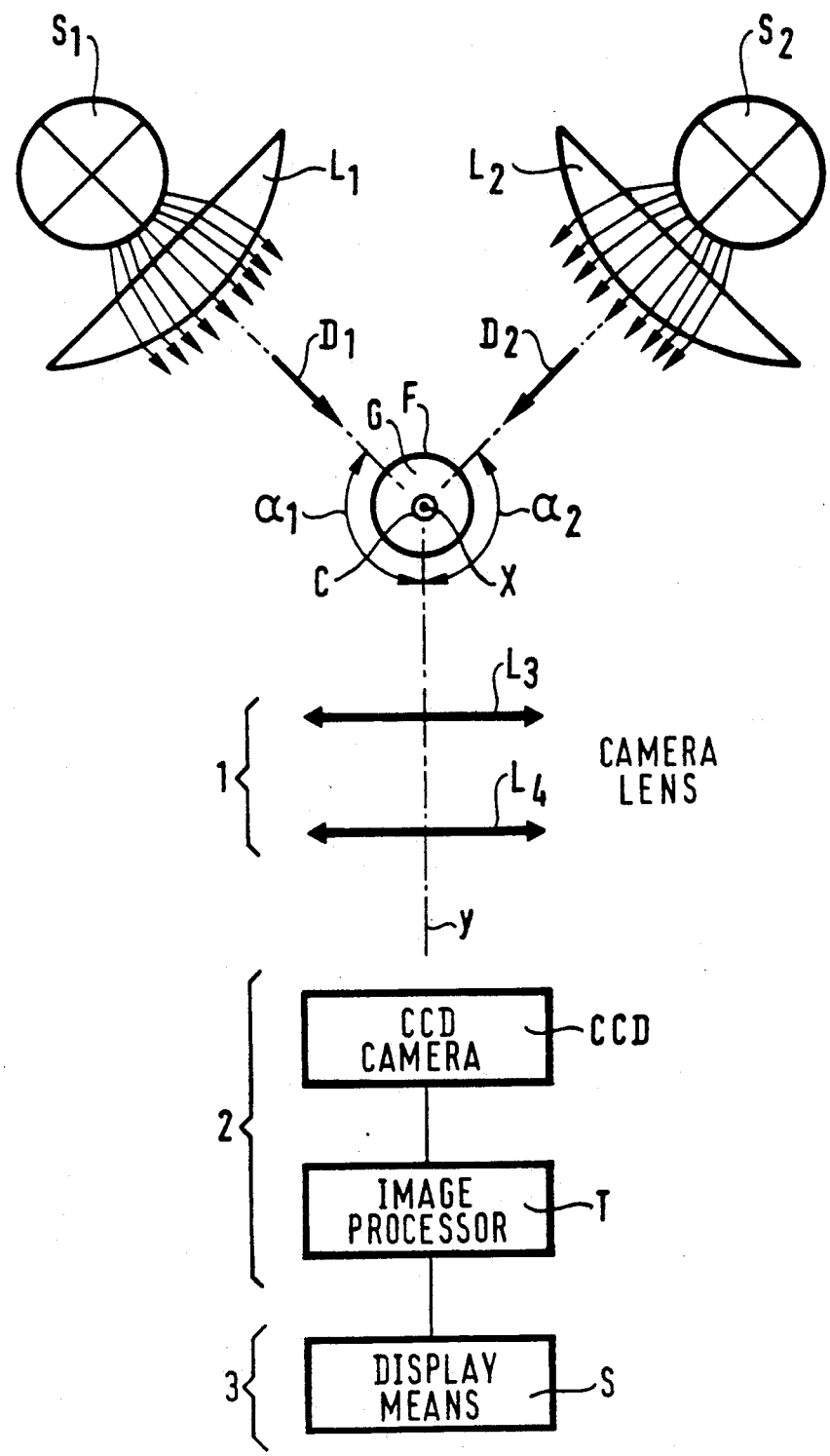
FIG. 1 is a diagram of a device of the invention, e.g. for observing a weld between two optical fibers.

In FIG. 1, two monochromatic light sources $S_1$ and $S_2$ emit light in mutually orthogonal directions respectively represented by arrows $D_1$ and $D_2$. These two directions $D_1$ and $D_2$ lie in a plane orthogonal axis X of a fiber F to be observed, which is represented merely by its core C and by its outer protective cladding G. Two lenses $L_1$ and $L_2$ are disposed between the sources $S_1$ and $S_2$ and the fiber F on the respective light paths. These two lenses serve to collimate the light emitted by $S_1$ and by $S_2$. Downstream from the fiber F, on its side opposite to the sources $S_1$ and $S_2$, there is an objective lens 1, reception means 2 for receiving and processing the image received from the fiber F, and display means 3 for displaying this image. The objective lens contains two parallel lens $L_3$ and $L_4$ having the same focal axis Y such that both the angle $\alpha_1$ between $D_1$ and Y and the angle $\alpha_2$ and Y are equal to 135°.

The reception and means 2 comprising a CCD camera connected to an image processing system T for processing the received CCD image is disposed downstream from the lens $L_4$. The plane of the CCD camera is parallel to the lenses $L_3$ and $L_4$. The display means 3 are connected to the image processor T and comprise a screen S.

In order to observe the core C of the fiber F in the two directions $D_1$ and $D_2$, the fiber F is illuminated by means of two sources $S_1$ and $S_2$.

Figure 2:
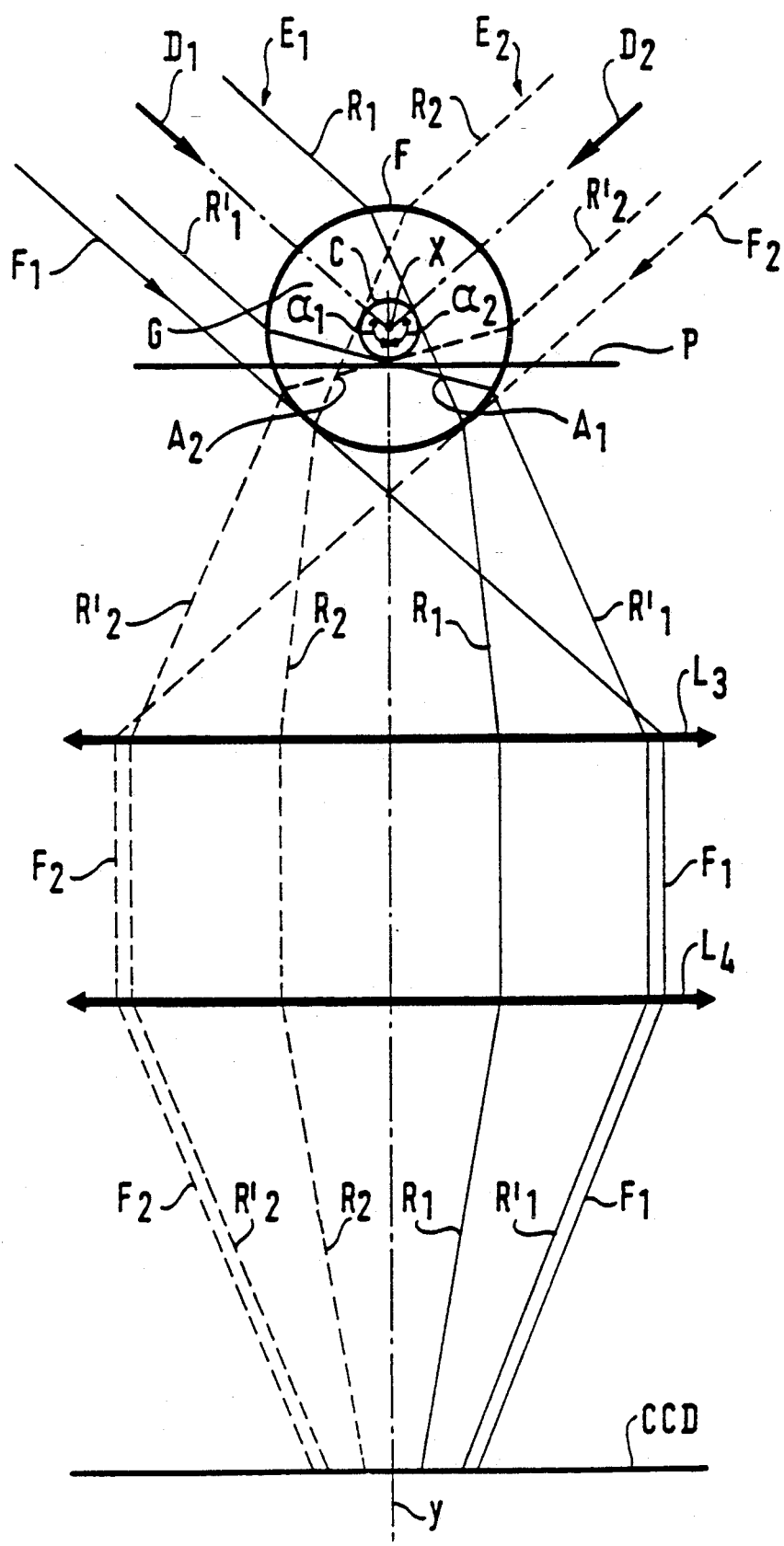
FIG. 2 shows the optical path of each of the beams.

In FIG. 2, the rays from the source $S_1$ are drawn with solid lines whereas rays from the source $S_2$ are drawn with dashed lines.

Rays from $S_1$ are travelling parallel to one another when they meet the fiber F and they are deflected inside the cladding G towards the core C. The same applies to rays from $S_2$ which penetrate into the cladding G. Rays from $S_1$ and $S_2$ after deflection by the cladding G and striking the core C, are further deflected thereby. Those rays which strike the core C tangentially are not deflected thereby.

For reasons of clarity, the figure shows only the rays $F_1$ and $F_2$ from the sources $S_1$ and $S_2$ that form the edges of the image of the fiber F. Similarly only the envelope $E_1$ of rays from $S_1$ forming the image of the core C in the direction $D_1$ and the envelope $E_2$ of the rays from $S_2$ forming the image of the core C in the direction $D_2$ are shown. The extreme rays $R_1$ and $R'_1$ forming the envelope $E_1$ are tangential to the core C and are therefore not deflected thereby. They cross each other downstream from the core C inside the cladding G at a point $A_1$. Similarly, the extreme rays $R_2$ and $R'_2$ forming the envelope $E_2$ are tangential to the core, are not deflected thereby, and cross each other downstream from the core C, inside the cladding G, at a point $A_2$.

The objective lens 1 is focused on a plane P orthogonal to the plane of the figure and parallel to the lenses $L_3$ and $L_4$. The plane P intercepts the fiber downstream from the points $A_1$ and $A_2$. Thus, a single image of the fiber F is obtained on the objective lens, within which two images $C_1$ and $C_2$ of the core C are formed as intercepted by the plane P.

Figure 3:
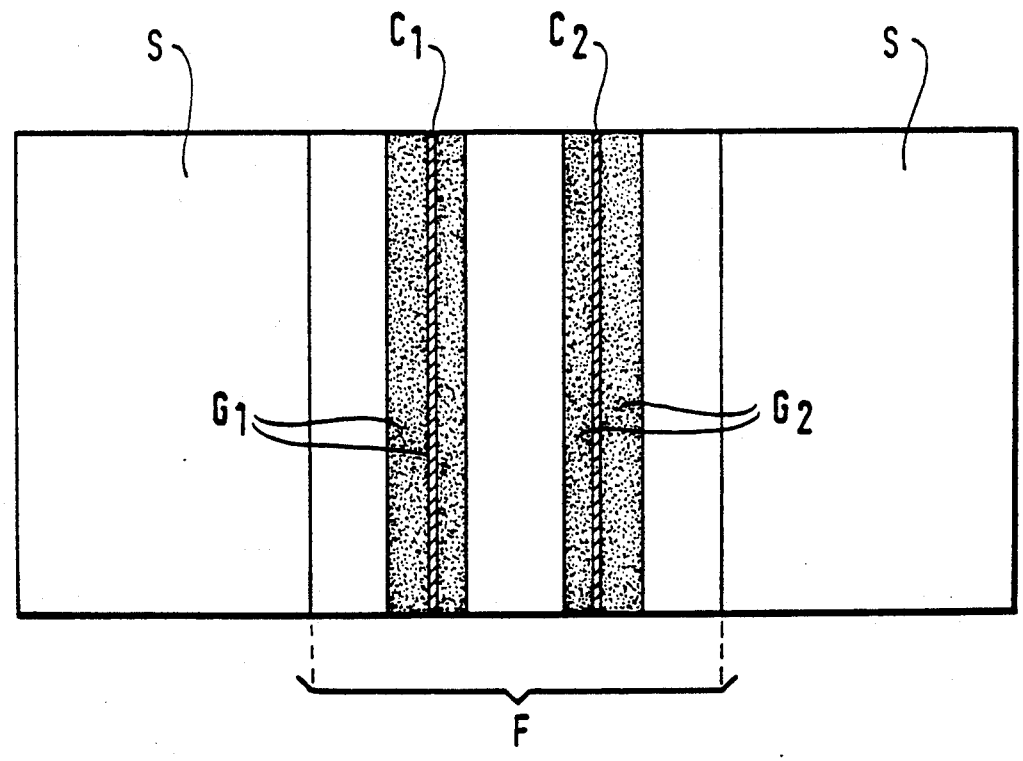
FIG. 3 shows the image displayed on the screen of the FIG. 1 device.

These images $C_1$ and $C_2$ of the core C within the image of the fiber F (also referenced F) are shown in FIG. 3 as observed on screen S. They have contrast differing from the remainder of the image, due to the difference between the refractive index $n_G$ of the cladding and the refractive index $n_C$ of the core: they are darker than the remainder of the image. The images of the core $C_1$ and $C_2$ are thus shown by means of thick solid lines, each surrounded by images of the intermediate cladding $G_1$ and $G_2$ which is represented by shading, and finally the image F of the fiber F. This makes it possible for the resulting image to be processed, and in particular for losses due to the weld to be calculated.

Because of the position of the focal axis Y ($\alpha_1 = \alpha_2 = 135°$), it is thus possible to intercept both beams simultaneously, the two beams having the same optical path length, and there being no need to use additional prisms or mirrors. Only one objective lens is used in association with a camera which receives both images of the core directly corresponding to two different orthogonal observation directions.

In addition, focusing the objective lens inside the fiber makes it possible to obtain a single image which is therefore easier to process.

A device is thus formed for displaying the core of a fiber in two orthogonal directions, which device is simple to use, and requires only limited equipment which is therefore cheaper than the conventional devices of the prior art. In addition, the device makes simple and rapid image processing possible.

Naturally, the invention is not limited to the embodiment described above.

In particular, it is possible to offset the axis Y, and thus to change the values of $\alpha_1$ and $\alpha_2$. However, when $\alpha_1 = 180°$, for example, the reception means no longer receives the image of the core in direction $D_2$. The same reasoning applies for $\alpha_2 = 180°$. There is thus a critical value $\alpha_{sup}$ which must not be exceeded by $\alpha_1$ or by $\alpha_2$. Above said value, e.g. for $\alpha_1 > \alpha_{sup}$, the image of the core C in the direction $D_2$ is deformed and too faint to be suitable for analysis. The value of $\alpha_{sup}$ corresponds to:

$$\alpha_{sup} = \tfrac{1}{2}(180-135)+135 = 157.5°.$$

Similarly, it is necessary for both $\alpha_1$ and $\alpha_2$ to be greater than $\alpha_{inf}$, whence:

$$\alpha_{inf} = 135 - 22.5 = 112.5°.$$

It is preferable to keep $\alpha_1$ and $\alpha_2$ between these two values.

Otherwise, there is no need for the two directions of illumination to be mutually orthogonal. If it is desired to observe the core of the fiber along other directions, it suffices merely to ensure that the angles $\alpha_1$ and $\alpha_2$ defined by said two directions relative to the focal axis Y do indeed remain between the two values $\alpha_{inf}$ and $\alpha_{sup}$ given above.

Further, there is no need for the light from $S_1$ and $S_2$ to be collimated before intercepting the fiber. However collimation is desirable in order to obtain better contrast in the received image.

Also, the device of the invention can be used, for example, to align the cores C and C' of two optical fibers F and F' to be welded together.

To align the fibers F and F', the fiber F is taken as the reference, for example, and then the fiber F' is moved in the direction $D_1$ until the images of C and C' are in alignment in said direction. Thereafter, the fiber F' is displaced in the direction $D_2$ until the images C and C' are in alignment in said direction.

Finally, the device of the invention can be adapted for use in observing possible defects in the core of an optical fiber running past the sources $S_1$ and $S_2$ parallel to its own longitudinal axis.

Naturally, any means may be replaced by equivalent means without going beyond the ambit of the invention.

We claim:

1. A device for displaying the core (C) of an optical fiber (F) in two directions that are transverse to said fiber (F), the device comprising:

two light sources illuminating said fiber, each emitting a beam of light, said beams having different directions $D_1$ and $D_2$, said directions lying in a plane that is orthogonal to the longitudinal axis (X) of said fiber (F);

an objective lens ($L_3$; $L_4$); and reception (2) and display (3) means for receiving and displaying images of said fiber (F) produced by said beams;

the device being characterized in that said objective lens is focused in a plane (P) that intercepts the beams from said fiber (F) inside said fiber (F), and in that the angle ($\alpha_1$, $\alpha_2$) between either of said directions ($D_1$, $D_2$) and the focal axis (Y) of said objective lens ($L_3$, $L_4$) is such that said objective lens ($L_3$, $L_4$) directly receives the two beams from said fiber (F) with sufficient light intensity to enable reception means (2) to operate.

2. A device according to claim 1, characterized in that said angle ($\alpha_1$, $\alpha_2$) between each of said directions $D_1$ and $D_2$ and said focal axis (Y) lies in the range 112.5° to 157.5°.

3. A device according to claim 1, characterized in that said directions $D_1$ and $D_2$ are mutually orthogonal.

4. A device according to claim 1, characterized in that said directions $D_1$ and $D_2$ are mutually orthogonal and said angle ($\alpha_1$, $\alpha_2$) is equal for both of the two directions ($D_1$, $D_2$) to 135°.

5. A device according to claim 1, characterized in that said beams are collimated prior to intercepting said fiber (F).

6. A device according to claim 1, characterized in that a lens is located on the path of each of said beams between each of said sources and said fiber, enabling said beams to be collimated.

7. A device according to claim 1, characterized in that said reception means (2) comprise a CCD camera (CCD) connected to an image processing system (T) for enabling the resulting image to be observed on a screen (S) of said display means (3).

* * * * *